S. A. WHEATLEY.
RESILIENT WHEEL.
APPLICATION FILED FEB. 2, 1916.
1,220,709. Patented Mar. 27, 1917.
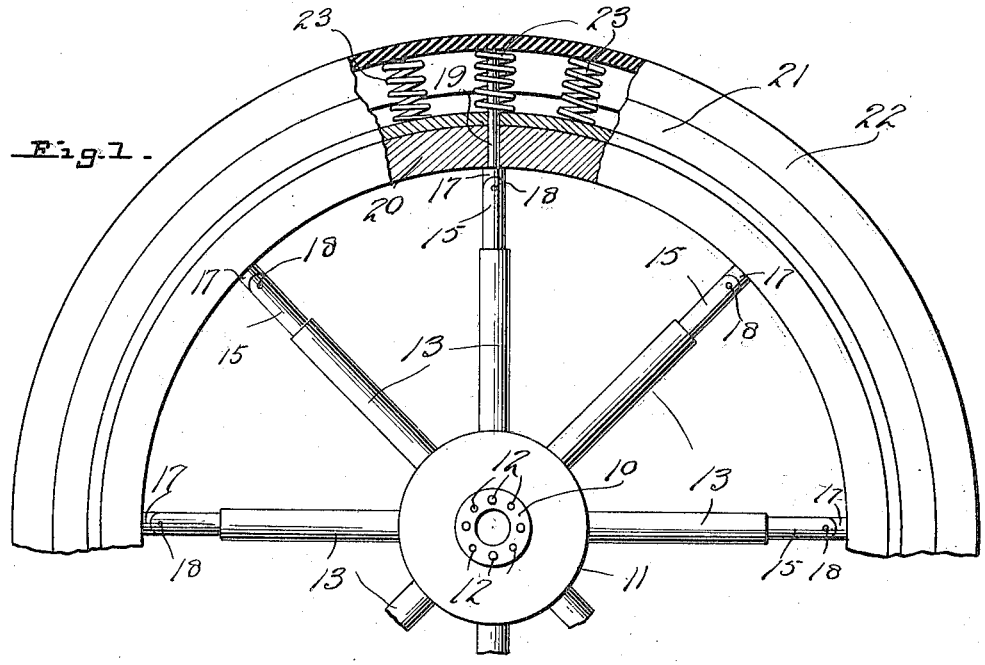
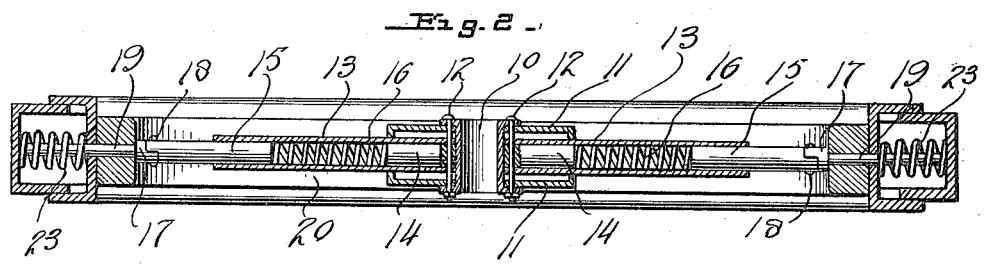
INVENTOR
Scott A. Wheatley.
WITNESSES
BY
ATTORNEY

UNITED STATES PATENT OFFICE.

SCOTT A. WHEATLEY, OF LA GRANDE, OREGON.

RESILIENT WHEEL.

1,220,709.  Specification of Letters Patent.  Patented Mar. 27, 1917.

Application filed February 2, 1916. Serial No. 75,717.

*To all whom it may concern:*

Be it known that I, SCOTT A. WHEATLEY, a citizen of the United States, residing at La Grande, in the county of Union and State of Oregon, have invented certain new and useful Improvements in Resilient Wheels, of which the following is a specification.

This invention relates to an improved resilient wheel and the principal object of the invention is to provide a wheel so constructed that the spokes will be yieldably held against longitudinal movement and to further so construct the wheel that the tire will be resilient thus providing a wheel so constructed that it may take up jolts received in going over rough places in a road without the necessity of a pneumatic tire.

Another object of the invention is to so construct the wheel that the spokes may telescope when necessary, springs being provided for yieldably holding the spokes against telescoping action but permitting the same when necessary.

Another object of the invention is to so construct the wheel that the tire will be yieldably held in the normal position both by the yieldably held spokes and also by the means of other springs positioned within the tire.

This invention is illustrated in the accompanying drawings, wherein:—

Figure 1 is a view showing a portion of a wheel principally in side elevation and partially in longitudinal section.

Fig. 2 is a transverse sectional view through the improved wheel.

This wheel is provided with a hub 10 having side plates 11 mounted thereon and held in place by bolts 12 which also serve to hold the sleeves 13 of the spokes and inner cores 14 in place. The plungers or outer sections 15 of these spokes are slidably mounted in the sleeves 13 and are yieldably held in spaced relation to the cores 14 by means of springs 16 so that the spokes will be yieldably held against longitudinal shortening movement but will be permitted to have this movement in order to take up shocks received in going over a rough road. These plungers 15 have their outer end portions 17 pivotally mounted as shown at 18 and reduced to provide fingers 19 extending through the felly 20 of the wheel and through the inner section 21 of the tire. The ends of these fingers 19 engage the outer section 22 of the tire and it will thus be seen that when pressure is applied to the tire, the plungers 15 will be moved toward the hub and thus the plungers 15 and springs 16 will serve to yieldably hold the outer section of the tire in a normal position. In order to provide additional means for yieldably holding the outer section of the tire 22 in place, there has been provided springs 23 positioned within the tire and connected with the inner and outer sections thereof in any suitable manner.

In the operation of this wheel, the spindle will pass through the hub 10 and when going over rough roads vibration will be taken up by the springs 16 and 23. It will thus be seen that it is not necessary to provide a pneumatic tire although of course, if desired, the outer section of this tire may be provided with a rubber tread to prevent noise. By having the sleeves 13 of the spokes pivotally mounted at their inner ends by means of the pins 12 and the plungers 15 which are slidably mounted in the sleeves, pivotally connected with their outer end portions 17, the spokes which extend vertically will be permitted to have the proper telescoping movement without the horizontal spokes and intermediate spokes interfering with the telescoping movement of the vertically extending spokes. If for any reason it is necessary to remove one of the spokes this can be done by taking out the pin 18 and bolt 12. Any necessary repair can then be made and either the old spoke or a new one put back in place.

What is claimed is:—

A resilient wheel comprising a hub, a felly, an inner tire section carried by said felly, an outer tire section slidably engaging the inner tire section, resilient means yieldably holding the outer tire section in an extended position, pins extending through said felly and inner tire section, outer spoke sections pivotally connected with said pins, inner spoke sections slidably engaging the outer spoke sections and pivotally connected with said hub, abutment cores in the inner spoke sections, and springs positioned between said cores and the outer spoke sections to yieldably hold the spokes extended.

In testimony whereof I affix my signature in presence of two witnesses.

SCOTT A. WHEATLEY.

Witnesses:
Roy B. Cuney,
Geo. H. Currey.

Copies of this patent may be obtained for five cents each, by addressing the "Commissioner of Patents, Washington, D. C."